US012422112B1

(12) United States Patent
Wen et al.

(10) Patent No.: US 12,422,112 B1
(45) Date of Patent: Sep. 23, 2025

(54) MULTI-ANGLE BENDABLE NEON LIGHT AND PROCESSING METHOD THEREFOR

(71) Applicant: Shenzhen Lingbenyang Optoelectronics Co., Ltd, Shenzhen (CN)

(72) Inventors: Xiaogui Wen, Shenzhen (CN); Jianguo Hu, Shenzhen (CN)

(73) Assignee: Shenzhen Lingbenyang Optoelectronics Co., Ltd, Shenzhen (CN)

( * ) Notice: Subject to any disclaimer, the term of this patent is extended or adjusted under 35 U.S.C. 154(b) by 0 days.

(21) Appl. No.: 19/095,122

(22) Filed: Mar. 31, 2025

(30) Foreign Application Priority Data

Feb. 28, 2025 (CN) ......................... 202510233760.5
Feb. 28, 2025 (CN) ......................... 202520340756.4

(51) Int. Cl.
*F21S 4/26* (2016.01)
*F21V 23/00* (2015.01)
*F21Y 103/10* (2016.01)
*F21Y 115/10* (2016.01)

(52) U.S. Cl.
CPC .............. *F21S 4/26* (2016.01); *F21V 23/002* (2013.01); *F21Y 2103/10* (2016.08); *F21Y 2115/10* (2016.08)

(58) Field of Classification Search
CPC ........ F21S 4/26; F21S 4/24; F21S 4/22; F21S 4/28; F21V 21/005; F21V 23/002; G09F 13/0404; G09F 13/0486
See application file for complete search history.

(56) References Cited

U.S. PATENT DOCUMENTS 11,655,946 B1 * 5/2023 Zhang ..................... F21V 31/04 362/217.01
2008/0239716 A1 * 10/2008 Lin ........................... F21S 4/26 362/219
2023/0417379 A1 * 12/2023 Li ............................. F21S 4/26
2025/0006403 A1 * 1/2025 Yuan ..................... F21V 23/002

FOREIGN PATENT DOCUMENTS

CN 104299533 A 1/2015
CN 207394472 U 5/2018
CN 116717738 A 9/2023
WO WO-2008134424 A2 * 11/2008 ................ F21S 4/28

OTHER PUBLICATIONS

Machine translation of Hu et al., CN 116717738 A, published Sep. 8, 2023 (Year: 2023).*

* cited by examiner

*Primary Examiner* — William N Harris
(74) *Attorney, Agent, or Firm* — Nitin Kaushik

(57) ABSTRACT

The present invention discloses a multi-angle bendable neon light strip and a processing method therefor. The neon light strip includes a coating substrate, a flexible light board, a transparent light strip, a flexible conductive base, an end cap, and a tail plug. The flexible light board includes multiple segments of light-emitting units. The flexible conductive base includes a flexible base and multiple braided wires. The transparent light strip is covered above the flexible light board. The end cap and the tail plug are installed at both ends of the coating substrate. This neon strip can be bent in any direction at any angle, to meet different application scenarios.

10 Claims, 17 Drawing Sheets

MULTI-ANGLE BENDABLE NEON LIGHT AND PROCESSING METHOD THEREFOR

CROSS-REFERENCE TO RELATED APPLICATIONS

The application claims priority to Chinese patent application No. 202520340756.4, and No. 202510233760.5 filed on Feb. 28, 2025, the entire contents of which are incorporated herein by reference.

TECHNICAL FIELD

The present invention relates to the field of the LED light strip technology, and in particular to a multi-angle bendable neon light strip and a processing method therefor.

BACKGROUND

Neon light strips are widely used in commercial building decoration, home decoration, entertainment venues, commercial advertising, and vehicle decoration, and the like due to rich colors and diverse shapes. The neon light strips are usually used to highlight outlines of buildings or window edges to attract customers' attention in commercial building decoration. The neon light strips can be installed on roofs, walls, or furniture edges in home decoration to create a warm, romantic, or fashionable atmosphere. However, there are some problems during use of the existing neon light strips. At present, the neon light strips on the market have strip-shaped light boards that can only be bent in a single direction, which limits the use in complicated shapes and diverse application scenarios. In addition, when the existing neon light strips are bent, internal circuits may be broken due to uneven stress, which results in breaking of entire strips. This not only increases use costs, but also affects the lighting effect and service life. The neon light strips have a higher failure rate and lower reliability in some special environments, such as extremely cold environments.

Therefore, how to improve the bending performance and reliability of the neon light strips has become a problem to be urgently resolved by technical personnel in the prior art.

SUMMARY

In view of this, the present invention is mainly intended to provide a multi-angle bendable neon light strip and a processing method therefor to overcome shortcomings in the prior art. The multi-angle bendable neon light strip can be bent in any direction at any angle to meet different application scenarios. Moreover, the flexible light board in the light strip is connected to the multiple segments of light emitting units, which are quickly connected to the flexible conductive base for power supply through soldering, making operation fast and easily, and forming multiple separate sections of light emitting units. A user can cut any section of the light emitting units and perform DIY according to needs flexibly and easily, so that the multi-angle bendable neon light strip has a wide range of applications.

To achieve the foregoing purpose, the following technical solutions are used in the present invention.

a multi-angle bendable neon light strip and a processing method therefor, including a coating substrate, a flexible light board, a transparent light strip, a flexible conductive base, an end cap, and a tail plug. The coating substrate is provided with an accommodating cavity for accommodating the flexible light board and the flexible conductive base, and the flexible light board and the flexible conductive base are located in the accommodating cavity. The flexible light board includes multiple segments of light emitting units that are sequentially connected, and each light emitting unit is provided with an LED light bead. The flexible conductive base includes a flexible base and multiple braided wires threaded through the flexible base, and the multiple segments of light-emitting units are electrically connected to the multiple braided wires, to form separate light-emitting units. The transparent light strip is located at an opening above the accommodating cavity and covers the flexible light board. The end cap and the tail plug are respectively installed at both ends of the coating substrate.

In a preferred solution, a lower surface of the flexible light board is in close contact with an upper surface of the flexible base; multiple base soldering holes are spaced on the flexible base corresponding to each braided wire, and multiple light board soldering holes are provided on the flexible light board corresponding to the multiple base soldering holes, the base soldering holes and the light board soldering holes are provided with solder paste to solder the flexible light board and the braided wire together.

In a preferred solution, multiple rectangular threading holes are longitudinally arranged side by side in the flexible base, and cross-sections of the braided wire corresponding to the threading holes are also rectangular.

In a preferred solution, the coating substrate includes a bottom wall and two side walls, a notch is opened at an end of the bottom wall, a hard adapter board is installed in the notch, an end of the braided wire is soldered to the hard adapter board; and a conductive wire is connected to the hard adapter board, and the conductive wire extends outside the coating substrate.

In a preferred solution, a lower end of the transparent light strip is provided with an accommodating groove for accommodating the LED light bead, and the LED light bead extends into the accommodating groove; and transparent silicone glue plugs are installed at both ends of the transparent light strip to improve waterproof performance of the light strip.

In a preferred solution, a hollow hole is provided between adjacent segments of the light-emitting units.

In a preferred solution, the light board soldering hole is larger than the base soldering hole, and solder paste completely fills the light board soldering hole.

In a preferred solution, ends of the multiple braided wires are respectively connected to guide plates, and the guide plates are correspondingly soldered to the hard adapter board.

In a preferred solution, the multiple braided wires are all braided tin-plated copper wires.

A processing method for the multi-angle bendable neon light strip is provided. multiple base soldering holes are spaced on the flexible base of the neon light strip corresponding to each braided wire; multiple light board soldering holes are provided on the flexible light board corresponding to the multiple base soldering holes; the coating substrate includes a bottom wall and two side walls, a notch is opened at an end of the bottom wall, and a hard adapter board is installed in the notch; and transparent silicone glue plugs for improving waterproof performance of the light strip are installed at both ends of the transparent light. The processing method includes the following steps:

S1: putting silicone glue into a mold, and then pressing the mold into a flexible base;

S2: threading multiple braided wires into threading holes of the flexible base, to form a strip-shaped flexible conductive base;

S3: tinning the braided wires in advance through a soldering iron in base soldering holes in the flexible base; and then matching light board soldering holes in the flexible light board with the base soldering holes in the flexible base one by one, and adding tin to the soldering iron to solder the braided wires firmly to the flexible light board, to form an electrical connection;

S4: after the flexible conductive base is soldered to the flexible light board, and aging test performance presents good, extruding a formed device and the silicone glue, and putting the formed device into a high-temperature vulcanization furnace to form a semi-finished product;

S5: processing one end of the semi-finished product by using a glue cutting fixture to create a notch, inserting the hard adapter board into the notch, and then firmly soldering the braided wires to the hard adapter board using a soldering iron or wire bonding machine with a fixture; and soldering the conductive wires to a corresponding hard adapter board using the soldering iron or the wire bonding machine;

S6: inserting the transparent silicone glue plugs into both ends of the semi-finished product and sealing end surfaces by injecting transparent silicone glue into small holes; and S7: placing one end of the processed semi-finished product that is soldered with a conductive wire into an end cap mold hole to form an end cap through injection molding, and placing the other end into a tail plug mold hole to form a tail plug through injection molding, and then finishing processing.

Compared with the prior art, the present invention has distinct advantages and beneficial effect. Specifically, it can be learned from the above technical solutions that the coating substrate, the flexible light board, the transparent light strip, the flexible conductive base, the end cap, and the tail plug are combined, to form the multi-angle bendable neon light strip in any direction and angle to meet different application scenarios. Moreover, the flexible light board in the light strip is connected to the multiple segments of light emitting units, which are quickly connected to the flexible conductive base for power supply through soldering, making operation fast and easily, and forming multiple separate sections of light emitting units. A user can cut any section of the light emitting units and perform DIY according to needs flexibly and easily, so that the multi-angle bendable neon light strip has a wide range of applications.

To describe the structural features and functions of the present invention more clearly, the following describes the present invention in detail with reference to the accompanying drawings and specific embodiments.

DESCRIPTION OF REFERENCE NUMERALS

10. coating substrate; 11. accommodating cavity; 12. bottom wall; 13. side wall; 14. notch; 20. flexible light board; 21. LED bead; 22. light board soldering hole; 23. hollow hole; 24. light emitting unit; 30. transparent light strip; 31. accommodating groove; 32. transparent silicone glue plug; 40. flexible conductive base; 41. flexible base; 42. braided wire; 43. base soldering hole; 44. threading hole; 45. guide plate; 50. end cap; 60. tail plug; 70. Hard adapter board; 80. conductive wire; 90. solder paste.

DETAILED DESCRIPTION OF THE EMBODIMENTS

Figure 1:
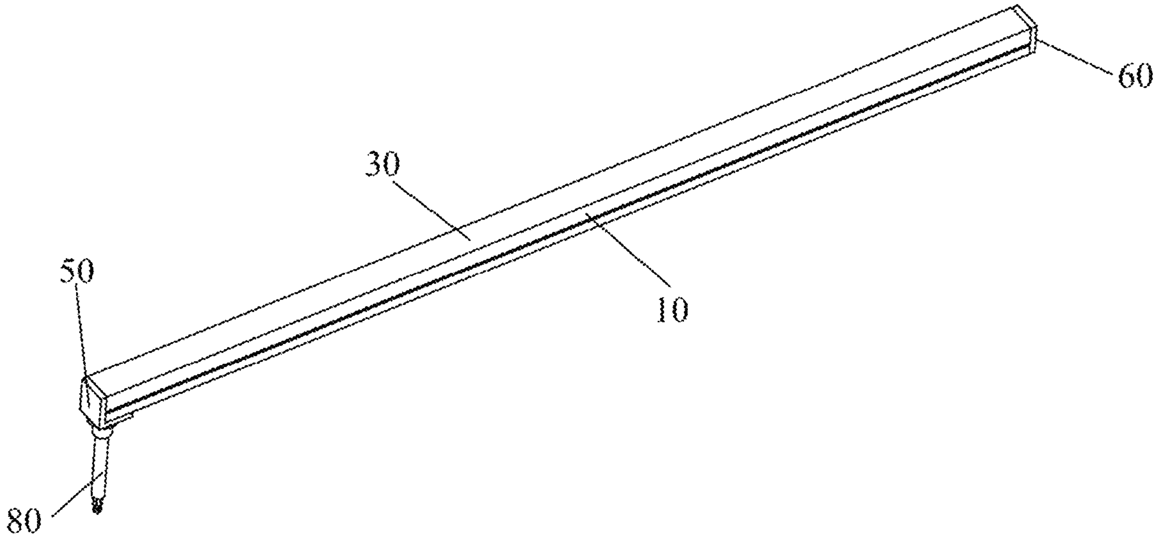
FIG. 1 is a schematic three-dimensional diagram of a strip according to the present invention.
Figure 2:
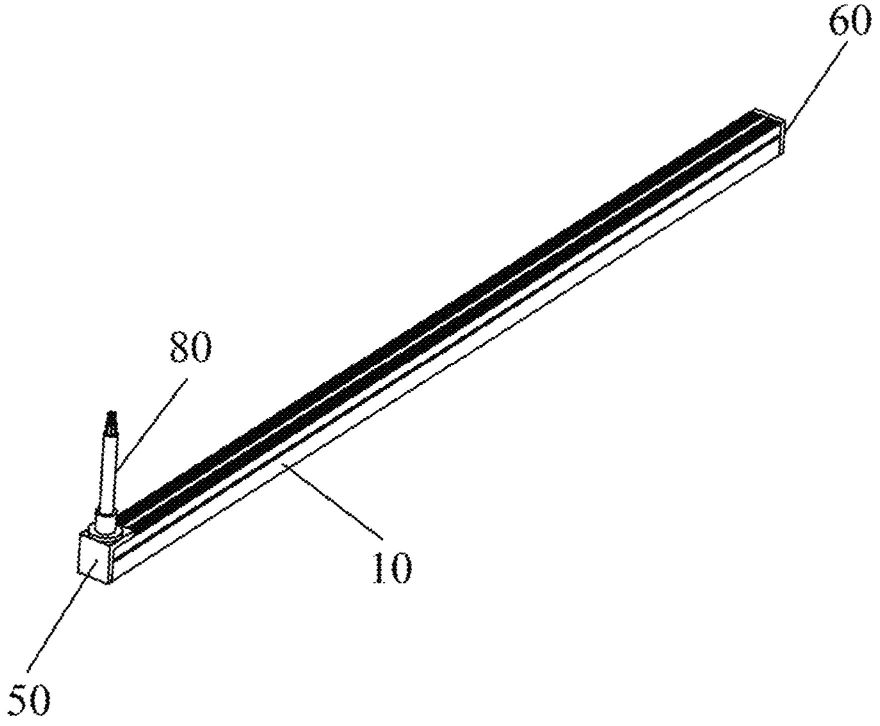
FIG. 2 is a schematic three-dimensional diagram of the strip from another perspective according to the present invention.
Figure 3:
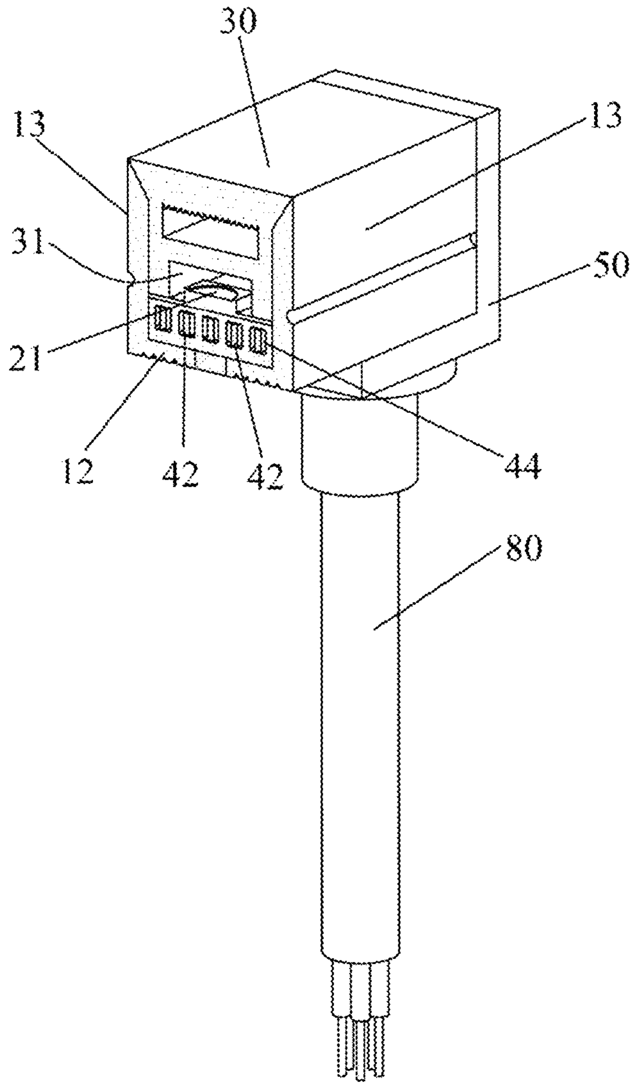
FIG. 3 is a schematic horizontal sectional view of the strip according to the present invention.
Figure 4:
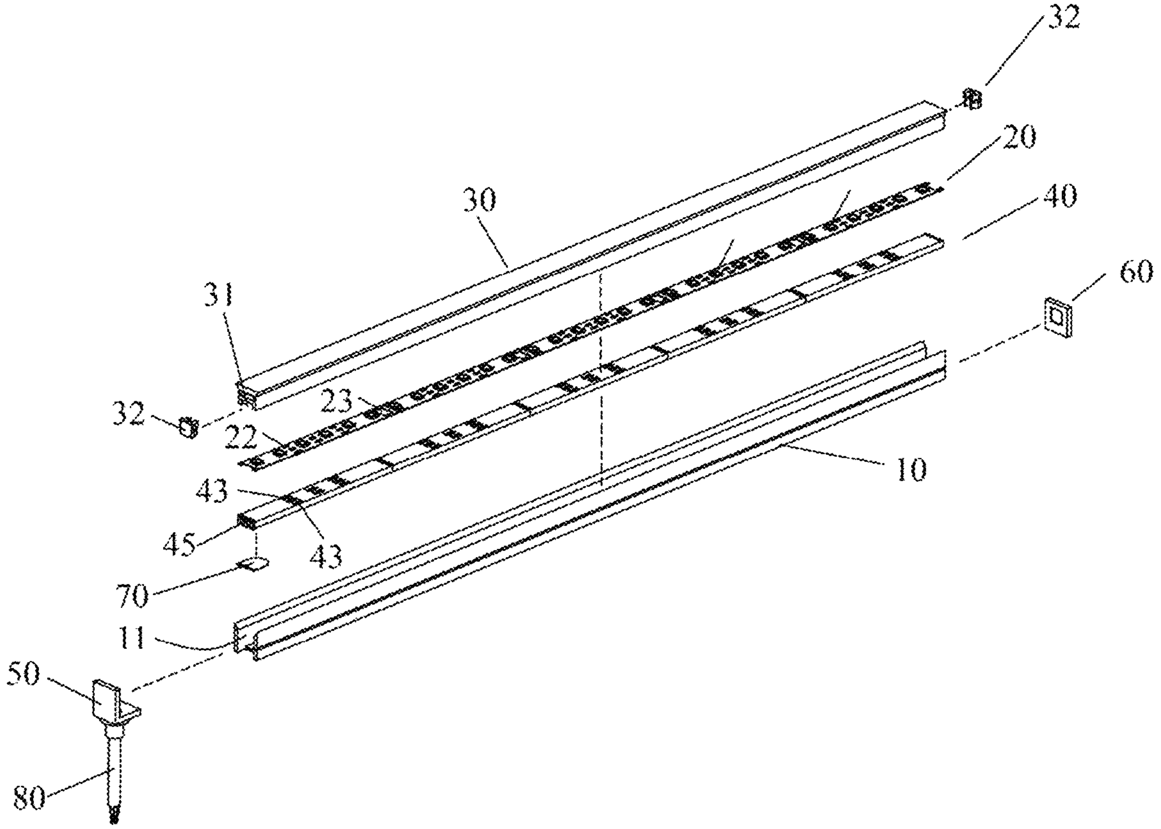
FIG. 4 is a schematic three-dimensional exploded diagram of the strip according to the present invention.
Figure 5:
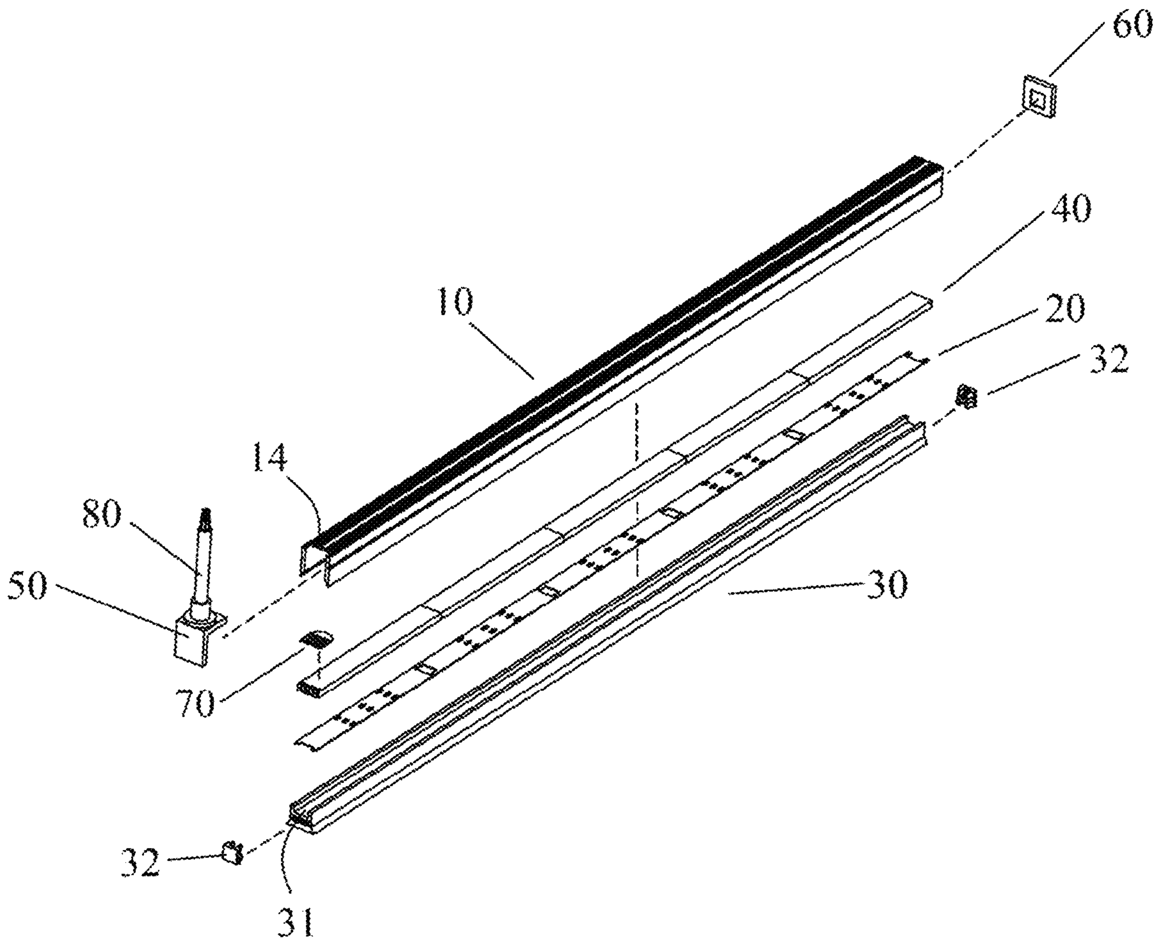
FIG. 5 is a schematic three-dimensional exploded diagram of the strip from another perspective according to the present invention.
Figure 6:
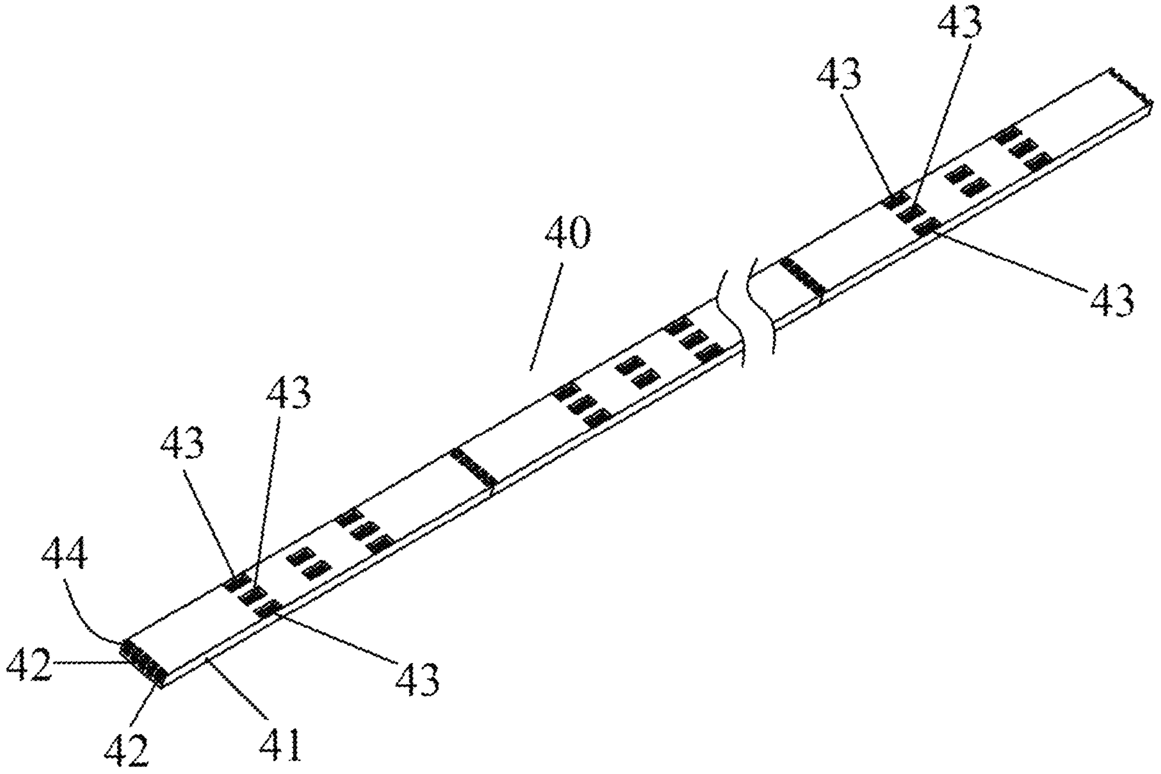
FIG. 6 is a schematic three-dimensional diagram of a flexible conductive base according to the present invention.
Figure 7:
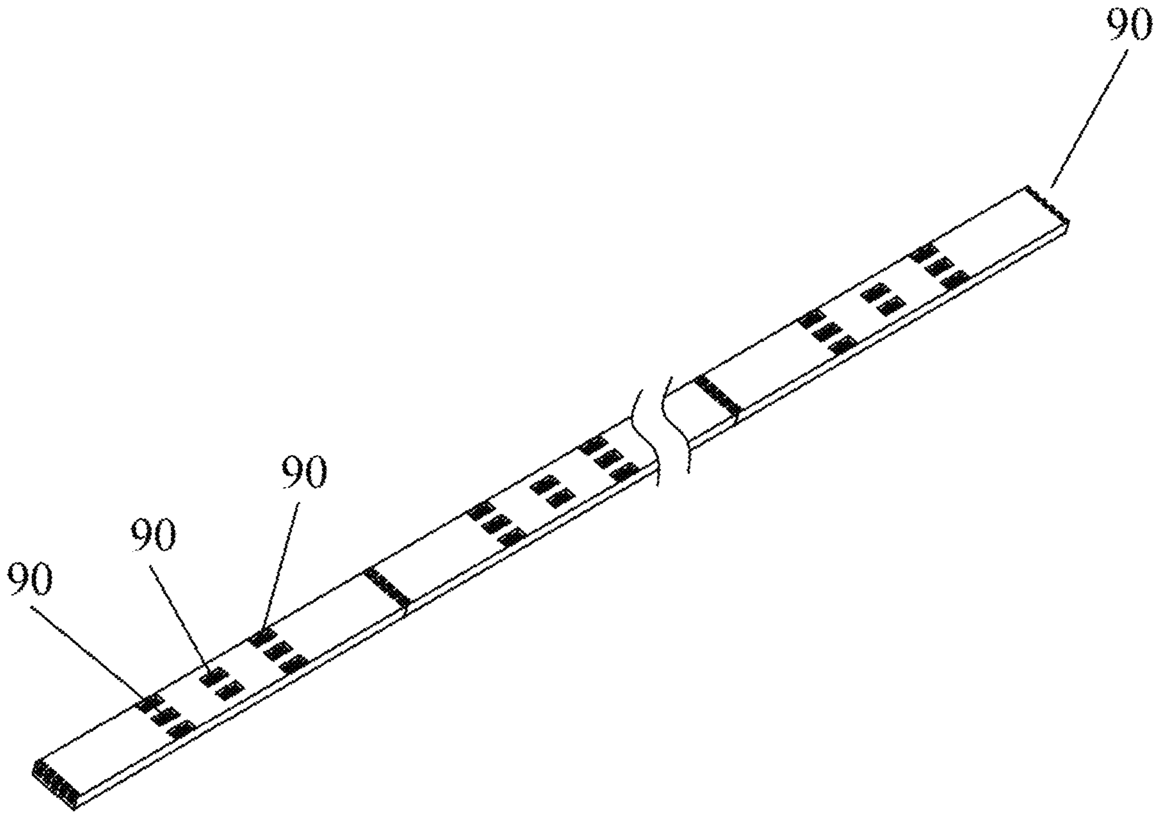
FIG. 7 is a schematic three-dimensional diagram of the flexible conductive base with a built-in soldering tin according to the present invention.
Figure 8:
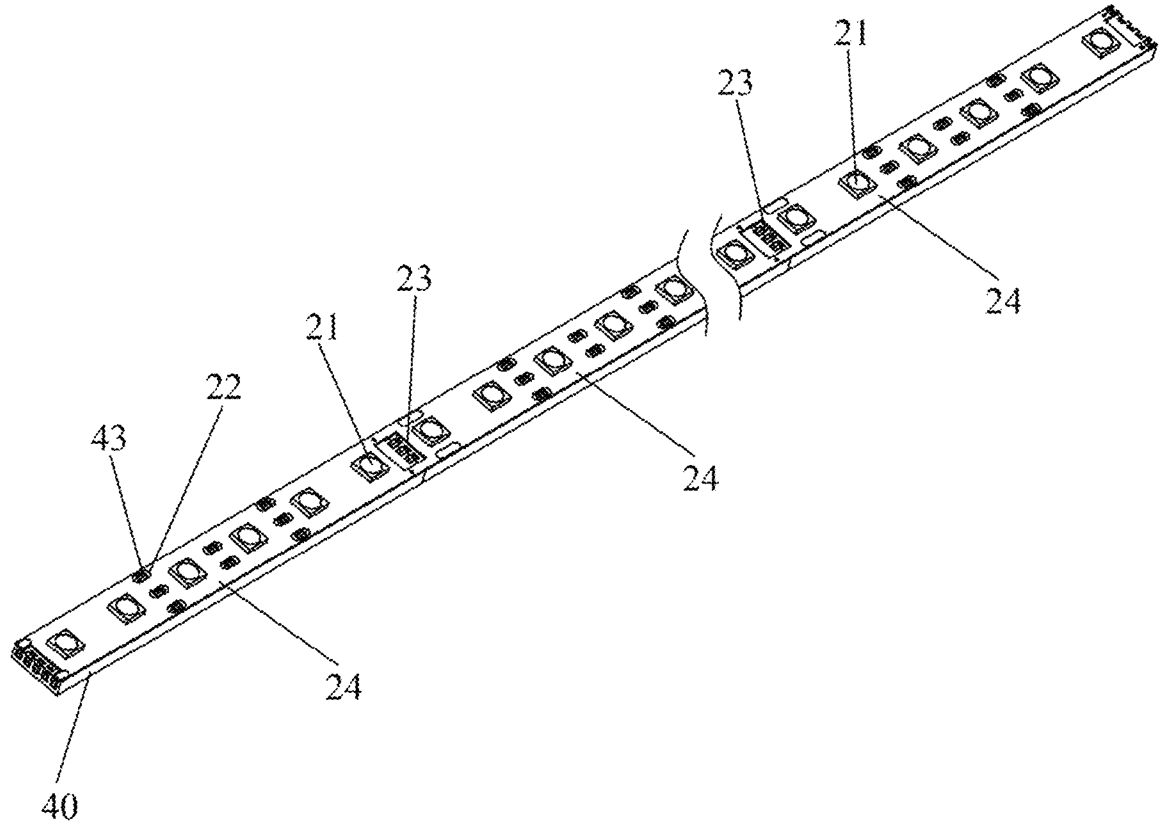
FIG. 8 is a schematic three-dimensional diagram of combination of a flexible light board and the flexible conductive base according to the present invention.
Figure 9:
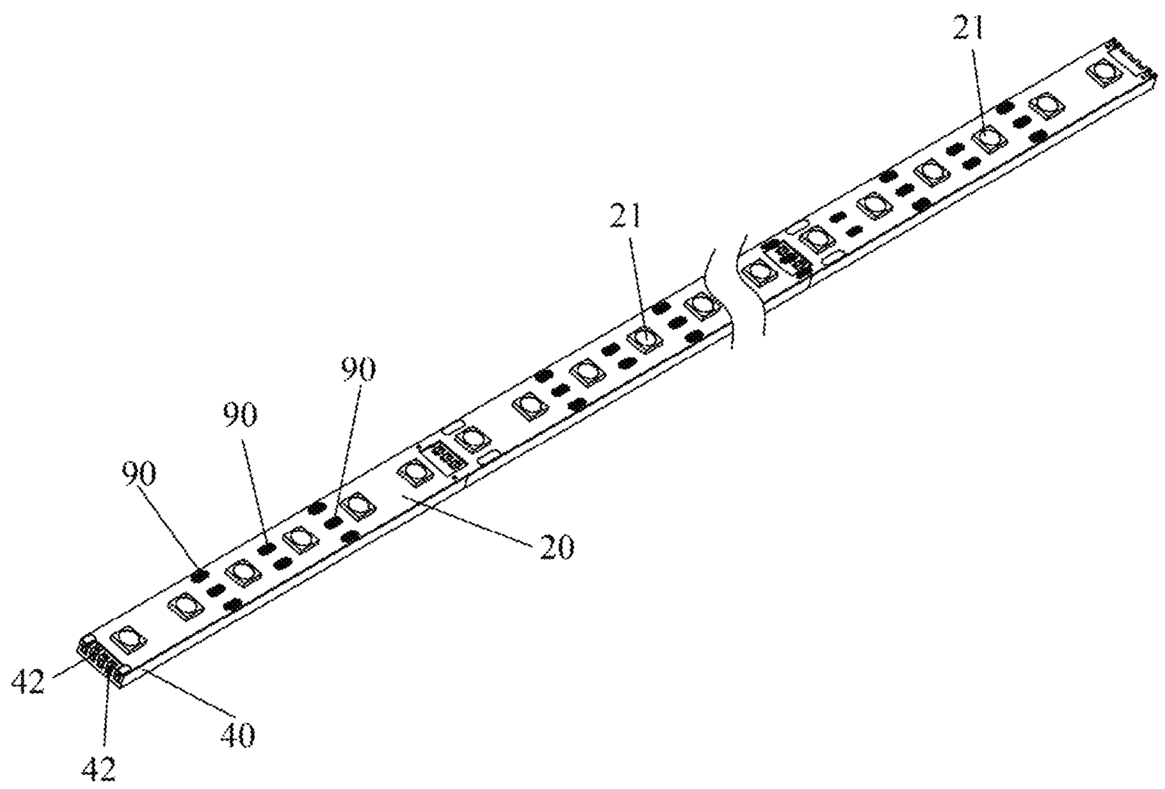
FIG. 9 is a schematic three-dimensional diagram of the flexible light board and the flexible conductive base after being electrically connected by soldering according to the present invention.
Figure 10:
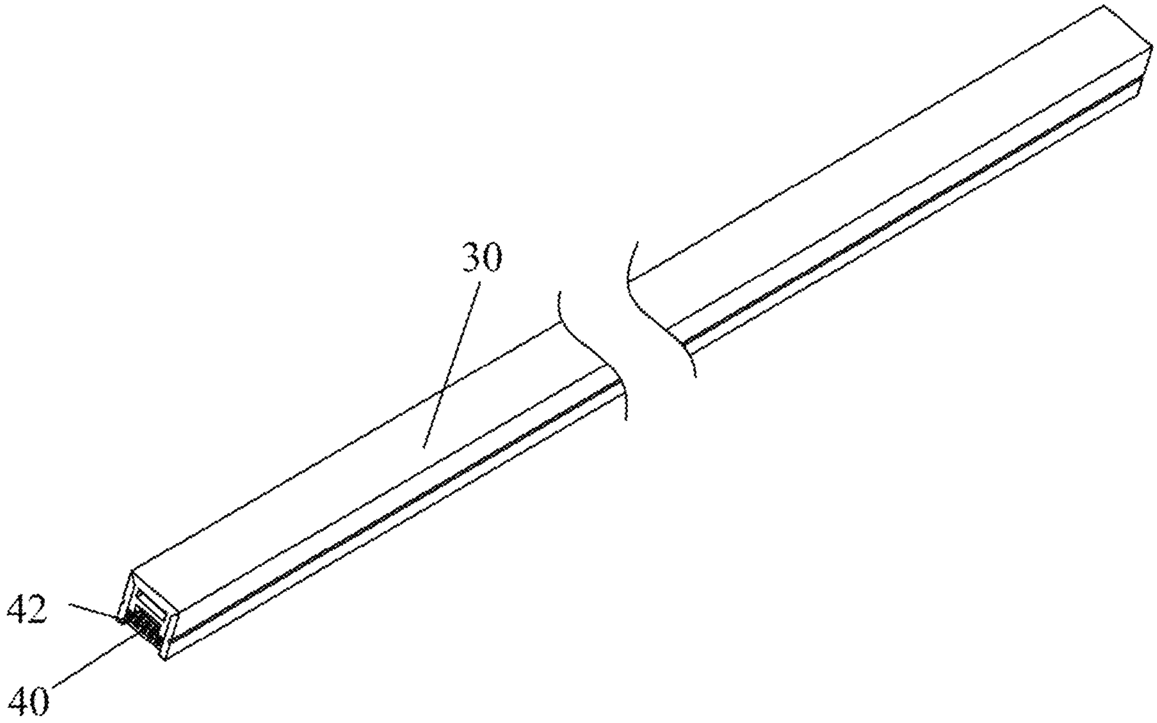
FIG. 10 is a schematic three-dimensional diagram of a semi-finished light strip according to the present invention.
Figure 11:
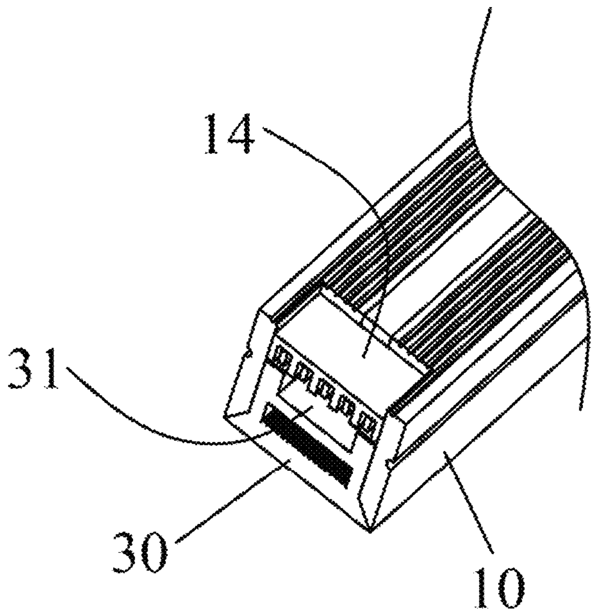
FIG. 11 is a schematic three-dimensional diagram of a notch in a coating substrate according to the present invention.
Figure 12:
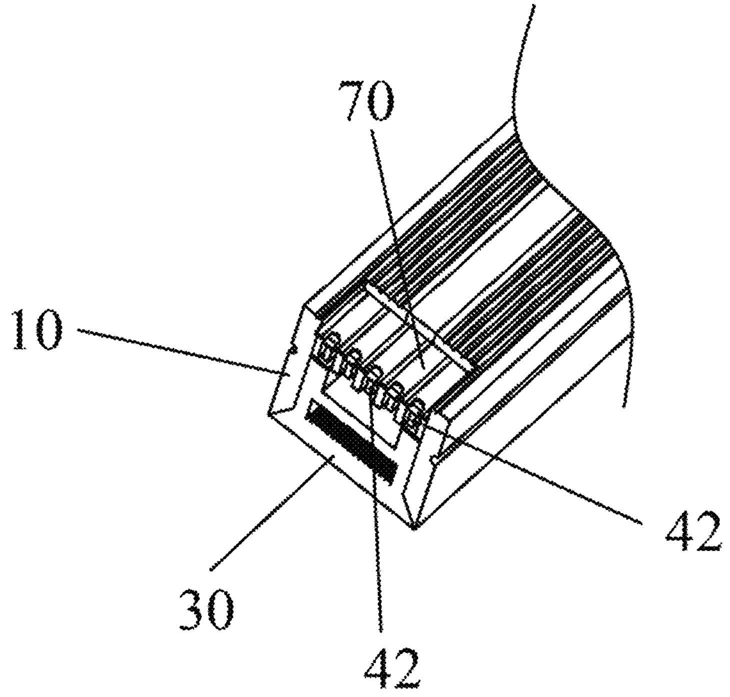
FIG. 12 is a schematic three-dimensional diagram of the notch, in the coating substrate, embedded with a hard adapter board according to the present invention.
Figure 13:
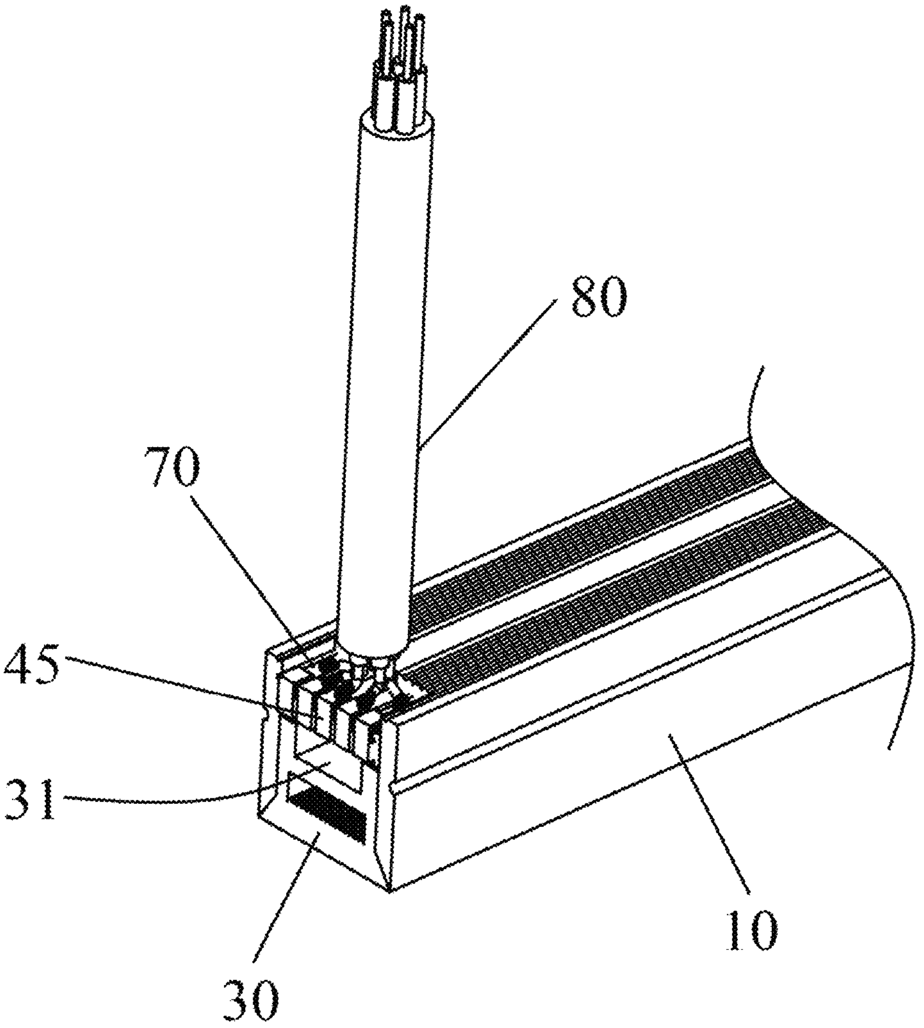
FIG. 13 is a schematic three-dimensional diagram of a conductive wire and the hard adapter board soldered together according to the present invention.
Figure 14:
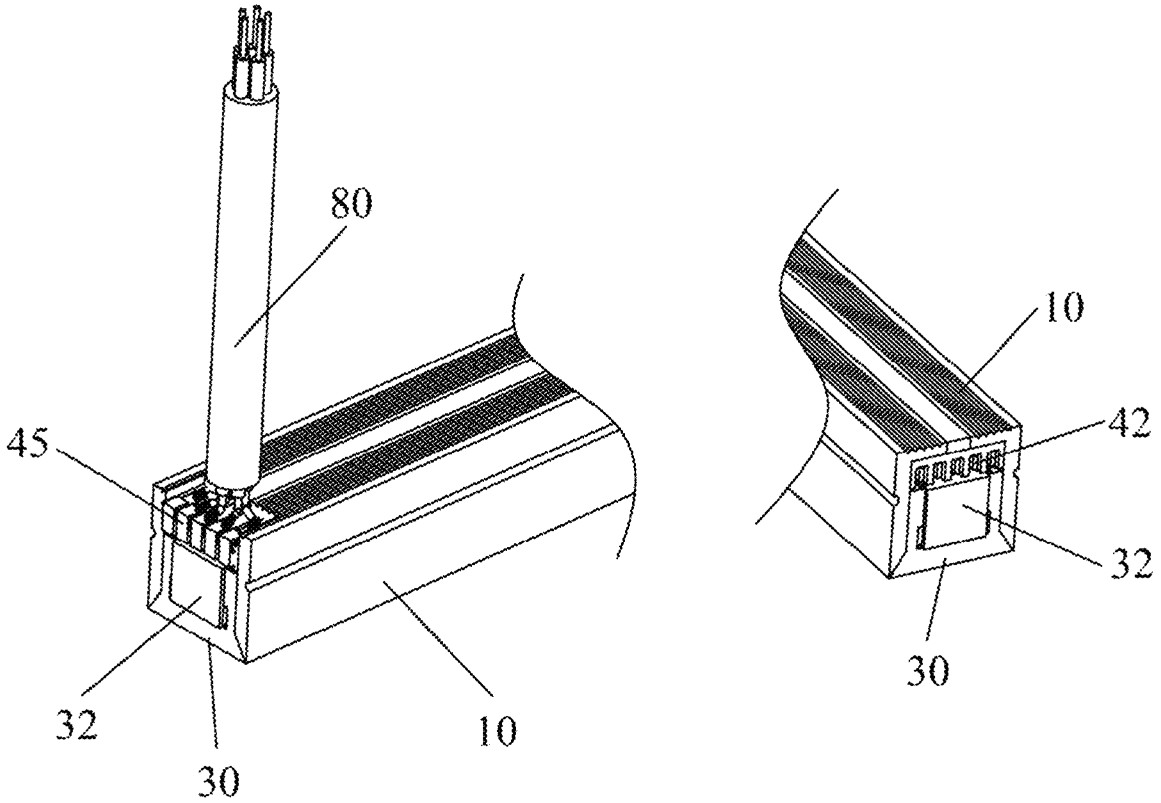
FIG. 14 is a schematic three-dimensional diagram of a transparent light strip with transparent silicone glue plugs embedded at both ends according to the present invention.
Figure 15:
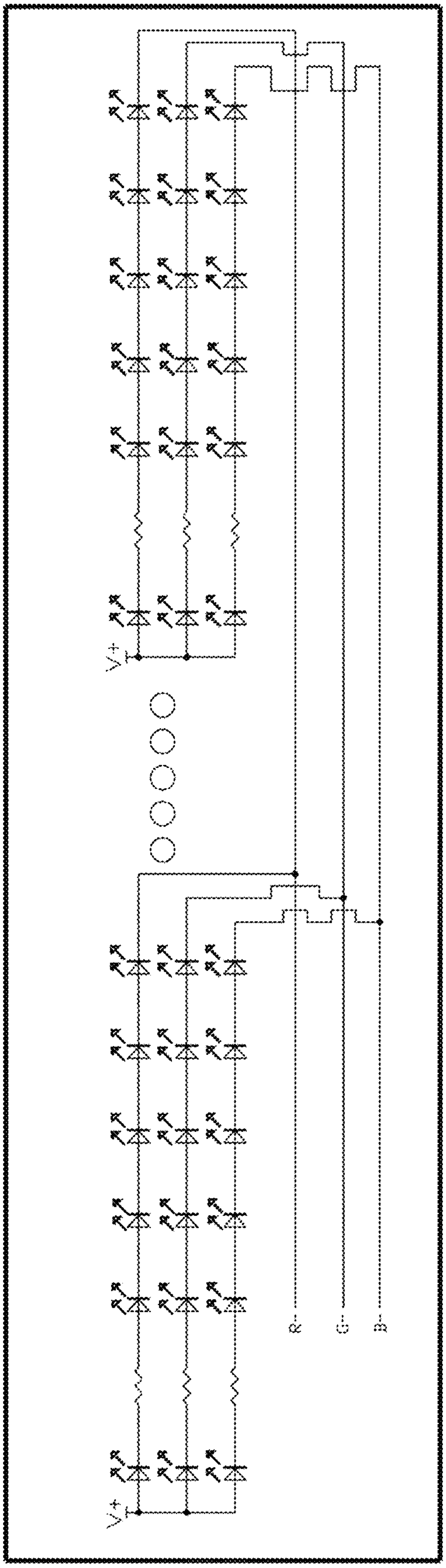
FIG. 15 is a schematic diagram of circuit connection when there are four braided wires in the present invention.
Figure 16:
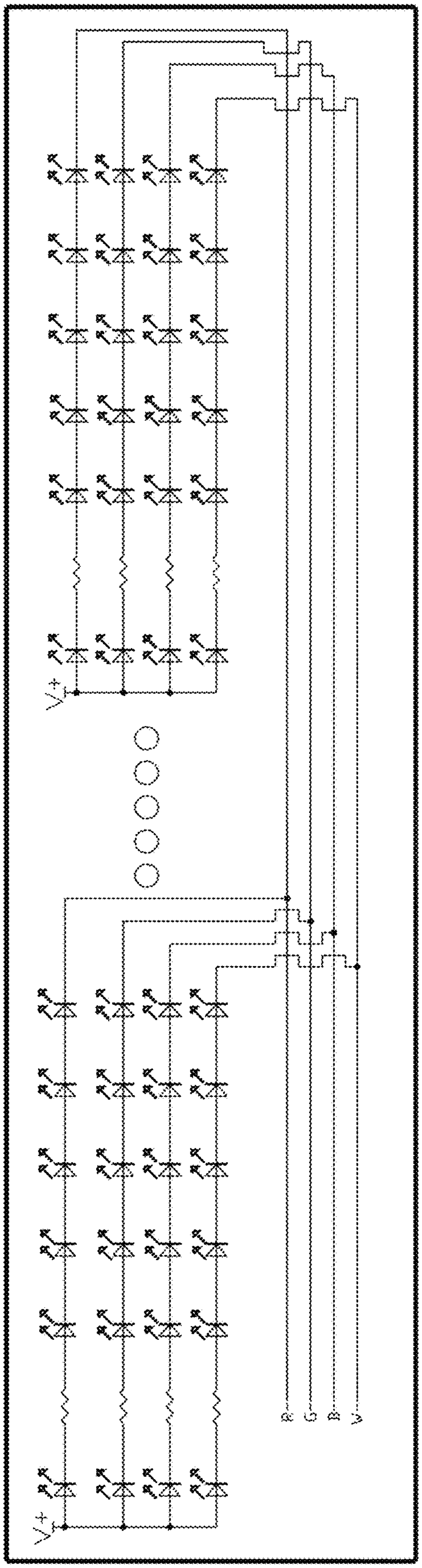
FIG. 16 is a schematic diagram of circuit connection when there are five braided wires in the present invention.
Figure 17:
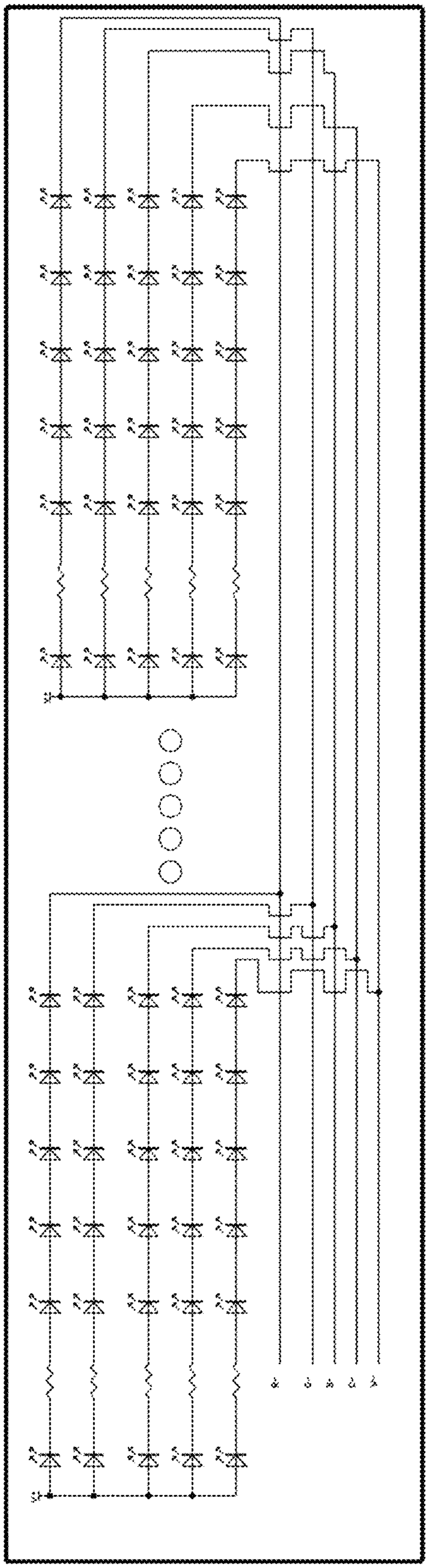
FIG. 17 is a schematic diagram of circuit connection when there are six braided wires in the present invention.

As shown in FIG. 1 to FIG. 17, the present invention provides a multi-angle bendable neon light strip and a processing method therefor. The neon light strip includes a coating substrate, a flexible light board, a transparent light strip, a flexible conductive base, an end cap, and a tail plug.

The coating substrate is provided with an accommodating cavity for accommodating the flexible light board and the flexible conductive base, and the flexible light board and the flexible conductive base are located in the accommodating cavity.

The flexible light board is formed by attaching several LED lights and several resistors on the flexible board using a high-speed pick-and-place machine. The flexible light board includes multiple segments of light emitting units that are sequentially connected, and each emitting unit is provided with an LED light bead. The flexible conductive base includes a flexible base and multiple braided wires threaded through the flexible base. The multiple segments of light-emitting units are electrically connected to the multiple braided wires, and each segment of light-emitting unit is a separate light-emitting unit. In addition, hollow holes are disposed between adjacent segments of light-emitting units. When the flexible light board is bent under stress, a position of the hollow hole is broken due to stress concentration. However, electrical connection of the light-emitting unit is not affected by the breakage, and the light-emitting unit can still emit light separately, thus preventing an entire light strip from being subjected to large twisting stress and improving overall anti-twisting performance of the light strip, and enabling the light strip to bend freely while ensuring a light emitting function. In addition, in practical use, the light strip can be cut along a hollow hole position based on a required length to form a single light-emitting unit or multiple connected light-emitting units, meeting application needs of different lengths of light strips and achieving completely DIY operation.

The transparent light strip is located at an opening above the accommodating cavity and covers the flexible light board. The LED beads can diffuse emitted light through the transparent light strip, so that the flexible light strip emits light uniformly. The end cap and the tail plug are correspondingly installed at both ends of the coating substrate.

A lower surface of the flexible light board is in close contact with an upper surface of the flexible base, and the flexible base is made of a soft material such as silicone glue. The lower surface of the flexible light board is in close contact with the upper surface of the flexible base. When the light strip is bent under stress, the flexible light board and the flexible base as a whole are subjected to a twisting force and deform synchronously, which can prevent mutual twisting caused by a gap therebetween and prevent friction and damage. In addition, the flexible base provides great toughness for the entire light strip, which can share large twisting stress and enable the light strip to have great bending strength as a whole.

Multiple base soldering holes are spaced on the flexible base corresponding to each braided wire, and multiple light board soldering holes are provided on the flexible light board corresponding to the multiple base soldering holes. The base soldering holes and the light board soldering holes are provided with solder paste to solder the flexible light board and the braided wire together. The light board soldering hole is larger than the base soldering hole, and the solder paste completely fills the light board soldering hole, so that the flexible light board and the braided wire can be stably connected through soldering, improving the conductivity stability. In addition, the soldering is easily operated, which improves the assembly efficiency of the product.

Multiple rectangular threading holes are longitudinally provided side by side in the flexible base, and cross-sections of the braided wire corresponding to the threading holes are also rectangular. Compared with traditional circular wire bending, the braided wire is subjected to force at 360 degrees. When the braided wire bends with the flexible base, the braided wire has an unstressed side, and clearance space is formed between an unstressed side and an inner wall of the threading hole, which reduces a bending resistance of the flexible base, improves bending flexibility and anti-bending strength, and can be adapted to a large-amplitude bending operation in any direction and at any angle and be adapted to different application scenarios.

Moreover, the multiple braided wires are all braided tin-plated copper wires, and the combination of a copper wire material and a braiding technology can effectively improve conductivity and flexibility and extend the service life of the product. It should be noted that a quantity of the braided wires can be set as needed. Attached diagrams show circuit connection diagrams when there are four, five, and six braided wires separately, which are respectively corresponding to different colored light-emitting LED beads. The four, five, and six braided wires include grounding wires, which are not shown in the diagrams.

The coating substrate includes a bottom wall and two side walls. A notch is opened at an end of the bottom wall, and a hard adapter board is installed in the notch. An end of the braided wire is soldered to the hard adapter board. A conductive wire is connected to the hard adapter board, and the conductive wire extends outside the coating substrate. Ends of the multiple braided wires are respectively connected to guide plates, and the guide plates are correspondingly soldered to the hard adapter board.

A lower end of the transparent light strip is provided with an accommodating groove for accommodating the LED light bead, and the LED light bead extends into the accommodating groove, effectively concentrating a light emission angle of the LED light beads and allowing light to emit from a bottom of the light strip. Transparent silicone glue plugs are installed at both ends of the transparent light strip to improve waterproof performance of the light strip.

A processing method for a multi-angle bendable neon light strip includes the following steps:

S1: putting silicone glue into a mold, and then pressing the mold into a flexible base;

S2: threading multiple braided wires into threading holes of the flexible base, to form a strip-shaped flexible conductive base;

S3: tinning the braided wires in advance through a soldering iron in base soldering holes in the flexible base; and then matching light board soldering holes in the flexible light board with the base soldering holes in the flexible base one by one, and adding tin to the soldering iron to solder the braided wires firmly to the flexible light board, to form an electrical connection;

S4: after the flexible conductive base is soldered to the flexible light board, and aging test performance presents good, extruding a formed device and the silicone glue, and putting the formed device into a high-temperature vulcanization furnace to form a semi-finished product;

S5: processing one end of the semi-finished product by using a glue cutting fixture to create a notch, inserting the hard adapter board into the notch, and then firmly soldering the braided wires to the hard adapter board using a soldering iron or wire bonding machine with a fixture; and soldering the conductive wires to a corresponding hard adapter board using the soldering iron or the wire bonding machine;

S6: inserting the transparent silicone glue plugs into both ends of the semi-finished product and sealing end surfaces by injecting transparent silicone glue; and S7: placing one end of the processed semi-finished product that is soldered with a conductive wire into an end cap mold hole to form an end cap through injection molding, and placing the other end into a tail plug mold hole to form a tail plug through injection molding, and then finishing processing.

The end cap and tail plug are specifically manufactured as follows: one end of the processed semi-finished product soldered with the conductive wire is placed into the end cap mold hole to form the end cap through injection molding, and the other end is placed into the tail plug mold hole to form the tail plug through injection molding. A material used for the end cap and the tail plug is liquid silicone glue A and B, which are mixed and injected into a mold through a silicone glue injection molding machine at a 1:1 ratio (first the transparent silicone glue plug is inserted into a hole on an end face of the transparent light strip, and then transparent silicone glue is injected into other small holes to seal end surfaces). This way, the liquid silicone glue does not flow into the interior of the light strip during injection molding to be integrated with one end of the light strip. The mold is pre-set with a constant temperature of 140-180 degrees and a mold opening time period of 80-120 seconds. The injected liquid silicone glue and a silicone glue sealing sticker are fully vulcanized at the pre-set temperature and time period to become solid and form a whole with a sleeve. This method features high production efficiency, a simple structure, and good sealing performance, and can achieve IP67 protection grade effect for water immersion.

The present invention is designed to mainly combine the coating substrate, the flexible light board, the transparent light strip, the flexible conductive base, the end cap, and the tail plug, to form the multi-angle bendable neon light strip. The multi-angle bendable neon light strip can be bent in any direction and angle to meet different application scenarios. Moreover, the flexible light board in the light strip is connected to the multiple segments of light emitting units, which are quickly connected to the flexible conductive base for power supply through soldering, making operation fast and easily, and forming multiple separate sections of light emitting units. A user can cut any section of the light emitting units and perform DIY according to needs flexibly and easily, so that the multi-angle bendable neon light strip has a wide range of applications.

The above description is only preferred embodiments of the present invention and does not limit a technical scope of the present invention in any way. Therefore, any minor modifications, equivalent changes, and modifications made to the above embodiments based on the technical essence of the present invention still fall within the scope of the technical solution of the present invention.

What is claimed is:

1. A multi-angle bendable neon light strip, comprising a coating substrate, a flexible light board, a transparent light strip, a flexible conductive base, an end cap, and a tail plug, wherein the coating substrate is provided with an accommodating cavity for accommodating the flexible light board and the flexible conductive base, and the flexible light board and the flexible conductive base are located in the accommodating cavity, the flexible light board comprises multiple segments of light emitting units that are sequentially connected, and each light emitting unit is provided with an LED light bead; the flexible conductive base comprises a flexible base and multiple braided wires threaded through the flexible base, and the multiple segments of light-emitting units are electrically connected to the multiple braided wires, to form separate light-emitting units; and the transparent light strip is located at an opening above the accommodating cavity and covers the flexible light board; and the end cap and the tail plug are correspondingly installed at both ends of the coating substrate.

2. The multi-angle bendable neon light strip according to claim 1, wherein a lower surface of the flexible light board is in close contact with an upper surface of the flexible base; multiple base soldering holes are spaced on the flexible base corresponding to each braided wire; and multiple light board soldering holes are provided on the flexible light board corresponding to the multiple base soldering holes, and the base soldering holes and the light board soldering holes are provided with solder paste to solder the flexible light board and the braided wire together.

3. The multi-angle bendable neon light strip according to claim 1, wherein multiple rectangular threading holes are longitudinally provided side by side in the flexible base, and cross-sections of the braided wire corresponding to the threading holes are also rectangular.

4. The multi-angle bendable neon light strip according to claim 1, wherein the coating substrate comprises a bottom wall and two side walls, a notch is opened at an end of the bottom wall, a hard adapter plate is installed in the notch, an end of the braided wire is soldered to the hard adapter plate; and a conductive wire is connected to the hard adapter board, and the conductive wire extends outside the coating substrate.

5. The multi-angle bendable neon light strip according to claim 1, wherein a lower end of the transparent light strip is provided with an accommodating groove for accommodating the LED light bead, and the LED light bead extends into the accommodating groove; and transparent silicone glue plugs are installed at both ends of the transparent light strip to improve waterproof performance of the light strip.

6. The multi-angle bendable neon light strip according to claim 1, wherein a hollow hole is provided between adjacent segments of the light-emitting units.

7. The multi-angle bendable neon light strip according to claim 1, wherein the light board soldering hole is larger than the base soldering hole, and solder paste completely fills the light board soldering hole.

8. The multi-angle bendable neon light strip according to claim 4, wherein ends of the multiple braided wires are respectively connected to guide plates, and the guide plates are correspondingly soldered to the hard adapter board.

9. The multi-angle bendable neon light strip according to claim 1, wherein the multiple braided wires are all braided tin-plated copper wires.

10. A processing method for the multi-angle bendable neon light strip according to claim 1, wherein multiple base soldering holes are spaced on the flexible base of the neon light strip corresponding to each braided wire; multiple light board soldering holes are provided on the flexible light board corresponding to the multiple base soldering holes; the coating substrate comprises a bottom wall and two side walls, a notch is opened at an end of the bottom wall, and a hard adapter board is installed in the notch; and transparent silicone glue plugs for improving waterproof performance of the light strip are installed at both ends of the transparent light, wherein the processing method comprises the following steps:

S1: putting silicone glue into a mold, and then pressing the mold into a flexible base;

S2: threading multiple braided wires into threading holes of the flexible base, to form a strip-shaped flexible conductive base;

S3: tinning the braided wires in advance through a soldering iron in base soldering holes in the flexible base; and then matching light board soldering holes in the flexible light board with the base soldering holes in the flexible base one by one, and adding tin to the soldering iron to solder the braided wires firmly to the flexible light board, to form an electrical connection;

S4: after the flexible conductive base is soldered to the flexible light board, and aging test performance presents good, extruding a formed device and the silicone glue, and putting the formed device into a high-temperature vulcanization furnace to form a semi-finished product;

S5: processing one end of the semi-finished product by using a glue cutting fixture to create a notch, inserting the hard adapter board into the notch, and then firmly soldering the braided wires to the hard adapter board using a soldering iron or wire bonding machine with a fixture; and soldering the conductive wires to a corresponding hard adapter board using the soldering iron or the wire bonding machine;

S6: inserting the transparent silicone glue plugs into both ends of the semi-finished product and sealing end surfaces by injecting transparent silicone glue into small holes; and S7: placing one end of the processed semi-finished product that is soldered with a conductive wire into an end cap mold hole to form an end cap through injection molding, and placing the other end into a tail plug mold hole to form a tail plug through injection molding, and then finishing processing.

* * * * *